US010787249B2

(12) United States Patent
Oberndorfer et al.

(10) Patent No.: US 10,787,249 B2
(45) Date of Patent: Sep. 29, 2020

(54) MULTI-STAGE REDUCTION OF IMPACT FORCES

(71) Applicant: Intel Corporation, Santa Clara, CA (US)

(72) Inventors: Fabian Oberndorfer, Germering (DE); Klaus Doth, Krailling (DE); Martin Stobbe, Krailling (DE)

(73) Assignee: Intel Corporation, Santa Clara, CA (US)

(*) Notice: Subject to any disclaimer, the term of this patent is extended or adjusted under 35 U.S.C. 154(b) by 335 days.

(21) Appl. No.: 15/782,660

(22) Filed: Oct. 12, 2017

(65) Prior Publication Data

US 2018/0099741 A1 Apr. 12, 2018

Related U.S. Application Data

(60) Provisional application No. 62/407,426, filed on Oct. 12, 2016.

(51) Int. Cl.
*B64C 25/62* (2006.01)
*B64C 25/10* (2006.01)
*B64C 25/06* (2006.01)
*B64C 39/02* (2006.01)

(52) U.S. Cl.
CPC .............. *B64C 25/62* (2013.01); *B64C 25/06* (2013.01); *B64C 25/10* (2013.01); *B64C 39/024* (2013.01); *B64C 2201/18* (2013.01)

(58) Field of Classification Search
CPC ......... B64C 25/62; B64C 25/06; B64C 25/10; B64C 39/024; B64C 2201/18; B64C 2201/027; A63H 27/12; A63H 27/00
See application file for complete search history.

(56) References Cited

U.S. PATENT DOCUMENTS

| | | | | |
|---|---|---|---|---|
| 2,630,989 A | * | 3/1953 | Sikorsky | B64C 25/62 244/102 R |
| 3,587,102 A | * | 6/1971 | Czerwinski | H01Q 1/28 343/708 |
| 6,922,610 B2 | * | 7/2005 | Okamoto | B25J 9/06 219/121.74 |
| 9,260,184 B2 | * | 2/2016 | Olm | B64C 27/08 |
| 9,914,537 B2 | * | 3/2018 | Wu | B64C 27/08 |
| 2014/0097293 A1 | * | 4/2014 | Roberts | B64C 25/02 244/100 R |

* cited by examiner

*Primary Examiner* — Medhat Badawi
*Assistant Examiner* — Vicente Rodriguez
(74) *Attorney, Agent, or Firm* — Hanley, Flight & Zimmerman, LLC (57) ABSTRACT

Multi-stage reduction of impact forces are disclosed. An example apparatus to reduce impact energy of an aircraft during landing includes a rotatable landing leg having a proximal end near an axis of rotation and a distal end opposite the proximal end, a first flexible portion of the proximal end, where the first flexible portion is to engage a first engaging portion at a first rotation angle of the rotatable landing leg, and a second flexible portion of the distal end, where the second flexible portion is to engage a second engaging portion at a second rotation angle of the rotatable landing leg.

19 Claims, 6 Drawing Sheets

MULTI-STAGE REDUCTION OF IMPACT FORCES

RELATED APPLICATION

This application claims the benefit under 35 U.S.C. § 119(e) to U.S. Provisional Application 62/407,426 titled "FLEXIBLE ANTENNA DRONE LANDING GEAR," filed Oct. 12, 2016, which is incorporated herein by this reference in its entirety.

FIELD OF THE DISCLOSURE

This disclosure relates generally to aircraft, and, more particularly, to methods and apparatus for multi-stage reduction of impact forces.

BACKGROUND

Unmanned aerial vehicles (UAVs), commonly referred to as drones, are becoming more readily available and have developed into a rapidly growing market. UAVs are now being used in a wide variety of industries, such as farming, shipping, forestry management, surveillance, disaster scenarios, gaming, etc. As both velocity and maneuverability for UAVs have increased, some UAVs and their associated components can undergo significant impact loading during landing. In particular, high speed landing scenarios or abrupt malfunction of a UAV can cause the UAV to be moved towards the ground at a relatively high velocity, thereby resulting in significant impact forces. Further, with the increase in application and function of UAVs, some UAVs now have increased communication requirements (e.g., increased RF performance requirements and/or increased wireless data throughput).

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Multi-stage reduction of impact forces are disclosed. Unmanned aerial vehicles (UAVs), which are commonly referred to as drones, are being more commonly used and have an increased variety of applications. During landing, some UAVs are subject to significant force and/or shock due to impact with the ground. In particular, such a significant force may result from the UAV approaching the ground at a high velocity and/or insufficient upward lift (intended or unintended) during landing. In addition to increased landing requirements, with the increased and varied functionality of UAVs (e.g., increased uses for more recent applications), some UAVs require increased RF communication requirements or capabilities (e.g., greater bandwidth transmit/receive capabilities, etc.).

The examples disclosed herein enable effective energy impact absorption for vehicles, such as aircraft (e.g., UAVs). In particular, some of the examples disclosed herein implement a rotatable landing leg (e.g., rotatable landing strut, landing gear, etc.) having a proximal end near a rotational pivot and a distal end opposite the proximal end. To significantly reduce impact loads of a UAV, a first flexible portion of the proximal end is to engage a first engagement portion or feature of a frame of the UAV at a first rotational angle of the landing leg. In addition, a second flexible portion of the distal end is to engage a second engagement portion or feature of the frame of the UAV at a second rotational angle of the landing leg. As a result, forces usually encountered by the UAV during landing are greatly decreased, thereby reducing potential damage of the UAV, which can result in downtime.

In some examples, the first flexible portion includes a snap while the first engagement portion includes a detent to retain the snap. In some examples, a force associated with an engagement of the second flexible portion to the second engagement portion is greater than a force associated with an engagement of the first flexible portion to the first engagement portion. In some examples, the second engagement portion includes a surface (e.g., an external surface) of a frame. In some examples, the landing leg includes an antenna (e.g., an antenna circuit board) disposed within.

As used herein, the term "frame" refers to a body, a surface, a feature, a component, a module (e.g., an add-on module) and/or an assembly of a vehicle (e.g., an aircraft, a UAV, a land vehicle, etc.). Accordingly, the term "frame" can refer to a frame (e.g., a tubular frame, an airframe, etc.), a fuselage and/or an external surface/component. As used herein, the term "landing leg" refers to a strut (e.g., a landing strut), a landing gear and/or any structure used to support or balance a vehicle against the ground or other object. As used herein, the term "antenna" refers to an antenna, an antenna assembly, antenna components, antenna circuitry and/or an antenna circuit board, etc.

Figure 1:
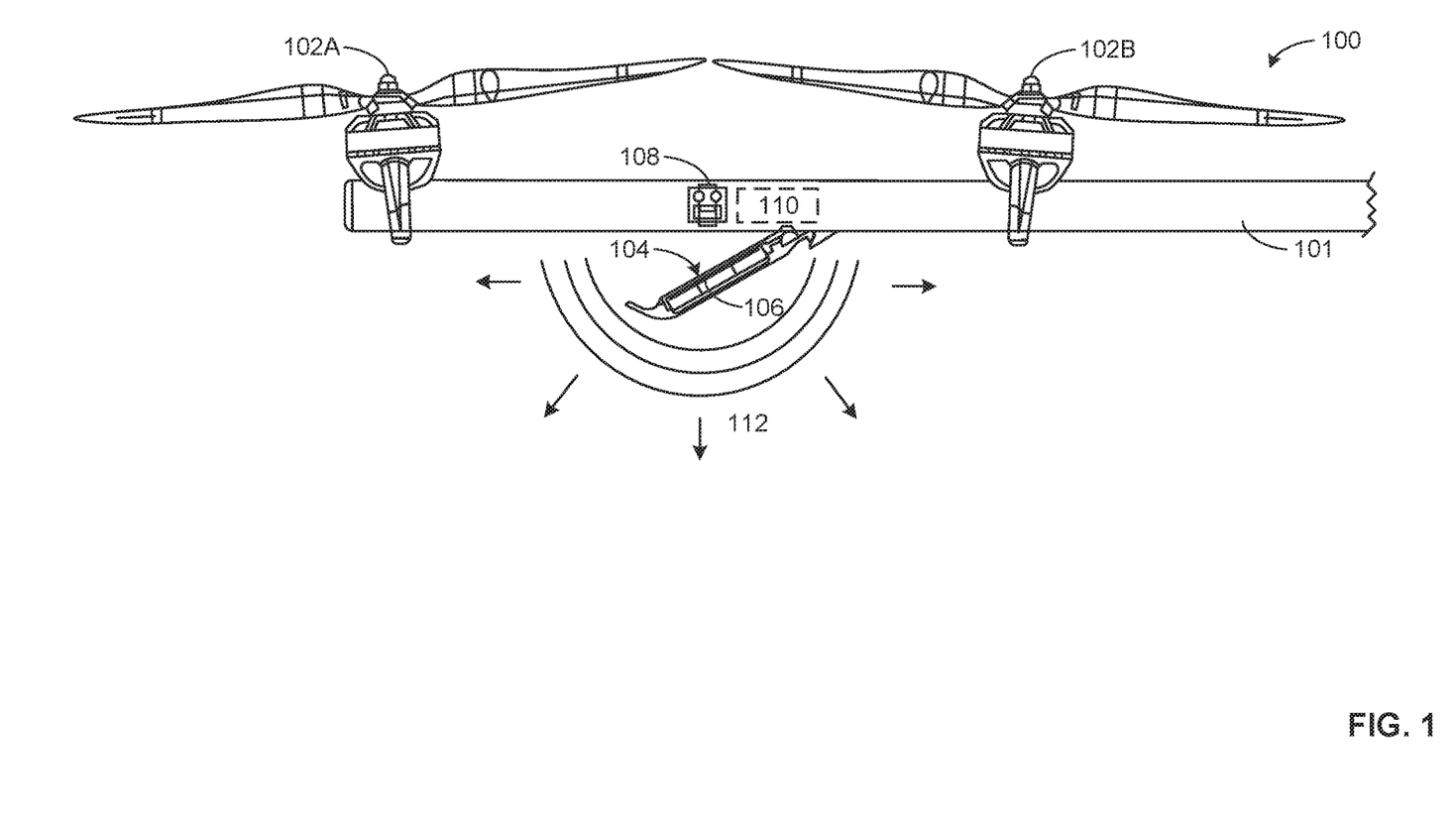
FIG. 1 illustrates an example unmanned aerial vehicle (UAV) in accordance with the teachings of this disclosure.

FIG. 1 illustrates an example unmanned aerial vehicle (UAV) 100 in accordance with the teachings of this disclosure. The UAV 100 of the illustrated example includes a tubular frame 101, and rotors 102A, 102B located at the top side/portion of the UAV 100 to generate lift, pitch, yaw, roll, and/or other movement force vectors pertinent to motion of the UAV 100. The example UAV 100 also includes a landing leg (e.g., a landing gear leg, a landing strut, a rotatable landing leg, etc.) 104 that is coupled, integral and/or attached to the tubular frame 101.

In some examples, the UAV 100 includes an antenna 106 disposed within the landing leg 104. The antenna 106 is communicatively coupled, through one or more wire leads and/or printed circuit board traces inside the tubular frame 101, to one or more flight control circuitry/logic components, such as a flight control logic board 108. The flight control logic 108 may comprise a processor, a memory, an ASIC, or other types of circuitry to receive, process, determine, and/or execute flight control information from a base station control or autonomously.

To reduce forces encountered during landing of the UAV 100, the landing leg 104 of the illustrated example rotates relative to the tubular frame 101. As will be discussed below in connection FIGS. 2-6 and 8, rotation of the landing leg 104 enables effective dissipation of impact energies by utilization of a multi-stage energy absorption process. As a result, a likelihood of potential damage to the UAV 100 and/or landing components associated with UAV 100 is greatly reduced during high velocity landings, for example.

In some examples, to facilitate transmission and/or reception of wireless date, the example UAV 100 shown in FIG. 1 includes one or more sensors (e.g., cameras, microphones, temperature sensors, altimeters, barometers, multi-spectral sensors, etc.) that can collect data that can be provided to communication logic 110, or other transmission and receiving logic integrated into the antenna component 106 itself. The data can then be wireless transmitted by the antenna 106 to a ground station or other receiving platform. Due to the location of the antenna 106 within the landing leg 104, the streaming data signal is substantially free from any line of site obstacles attached to the drone to freely stream to the ground in multiple directions 112 relative to a reference horizon.

Figure 2:
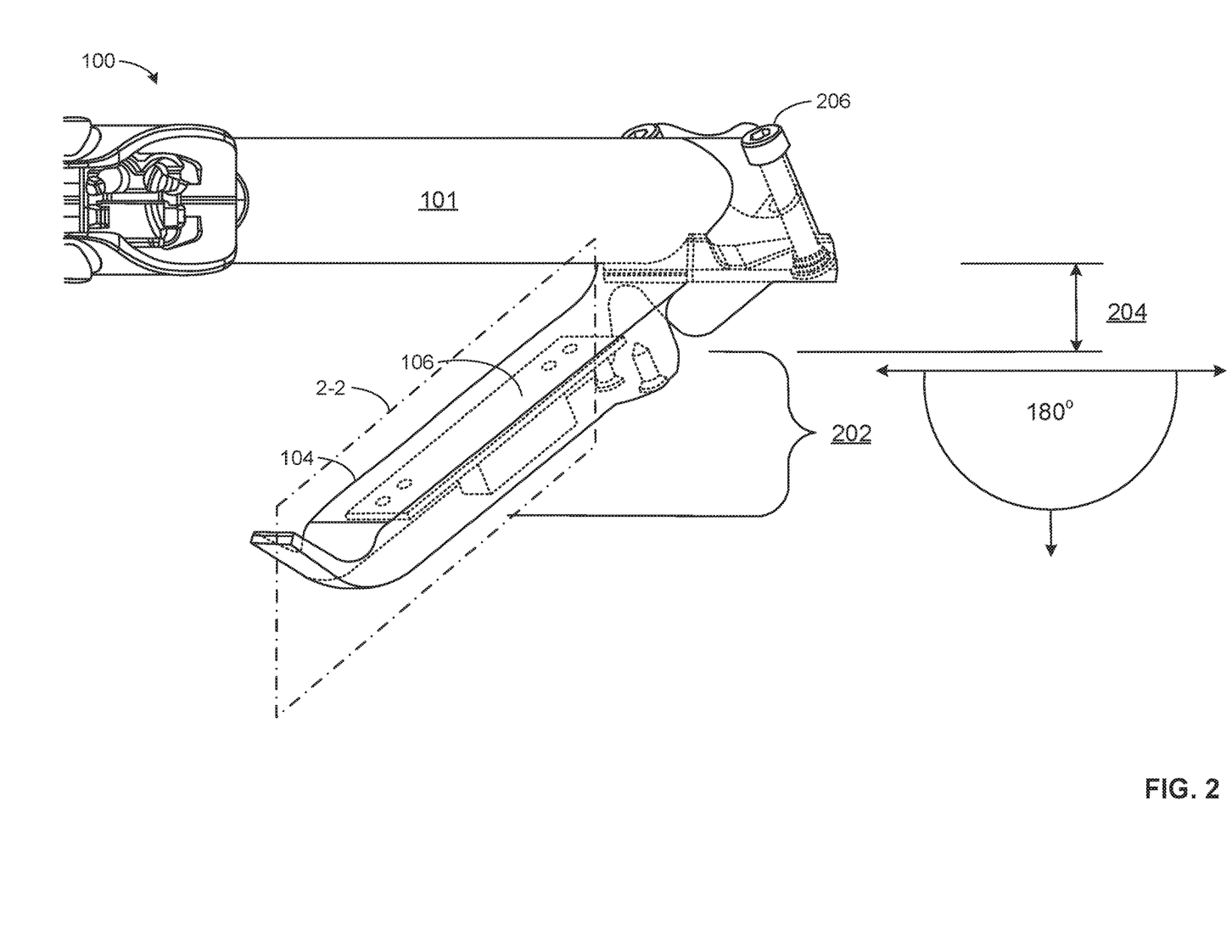
FIG. 2 is a detailed view of a portion of the example UAV of FIG. 1.

FIG. 2 is a detailed view of a portion of the example UAV 100 of FIG. 1. According to the illustrated example of FIG. 2, the antenna 106 has a downward height (e.g., a vertical height, an effective length, etc.) 202. Accordingly, the antenna 106 is at an offset height 204 below the frame 101 based on a current rotational angle of the landing leg 104 in this example. According to the illustrated example, mechanical fasteners (e.g., screws) 206 couple the antenna 106 to the frame 101 so that the antenna 106 is generally facing downward relative to the frame 101, thereby allowing a relatively free line of sight of approximately 180 degrees in range of the antenna 106 to other communication devices and/or the ground.

Figure 3:
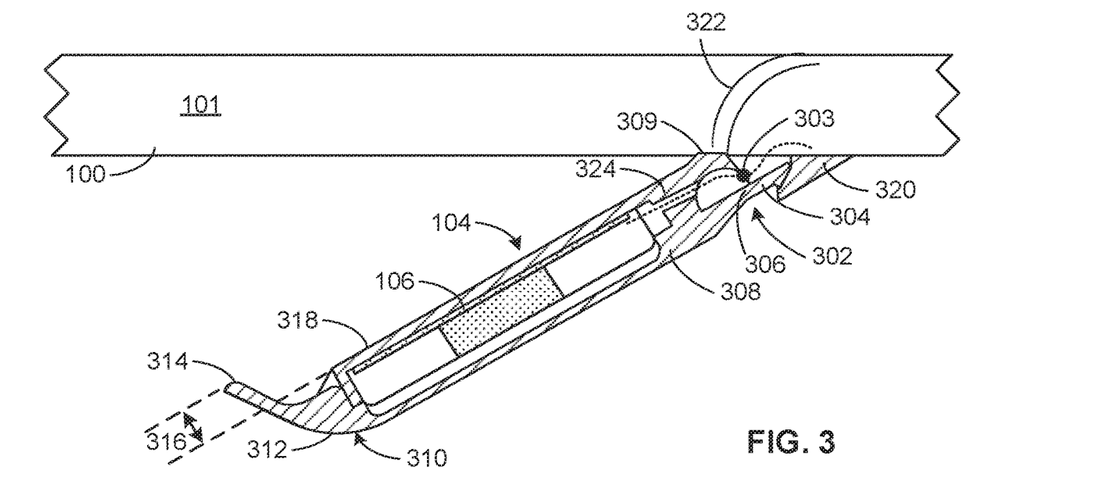
FIG. 3 is a cross-sectional view along a plane 2-2 of FIG. 2 depicting an example landing leg shown fully extended from a UAV frame.

FIG. 3 is a cross-sectional view along a plane 2-2 of FIG. 2 depicting the example landing leg 104 shown fully extended from the tubular frame 101. In particular, the landing leg 104 is shown in a default flight position in which the UAV 100 has not yet approached the ground and/or a landing site. According to the illustrated example, the landing leg 104 includes a first flexible portion 302, which is located near a pivot (e.g., an axis of rotation) 303 and includes a snap 304, a narrow portion 306 and a base 308. In some examples, the landing leg 104 also includes a secondary contact portion 309. In some examples, the secondary contact portion 309 is integral with the first flexible portion 302. The example landing leg 104 also includes a second flexible portion 310 located at a distal portion or end of the landing leg 104. In this example, the second flexible portion 310 includes a wider base 312 and a narrower finger 314 that extends a distance 316 from an inner surface 318 of the landing leg 104. According to the illustrated example, the finger 314 exhibits a curved shape (e.g., a curved arcuate shape) that is angled towards the frame 101.

To retain the landing leg 104 in the default flight position (e.g., a prior to landing position) shown in FIG. 3, the snap 304 of the illustrated example is retained by a detent (e.g., a notch, a receptacle, etc.) 320, which is associated with (e.g., defined within) the frame 101 and/or defined in a component assembled to the frame 101. Accordingly, the detent 320 acts a first engaging portion of the frame 101 in this example. In this example, engagement of the snap 304 with the detent 320 locks or holds the landing leg 104 into a default angular or first rotational position (e.g., a first angular position, a first angle of rotation). In this example, a geometry of the narrow portion 306 prevents removal of the snap 304 from the detent 320 until a threshold force and/or torque is met when the landing leg 104 is rotated away from the first rotational position.

In this example, the detent 320 exhibits a ramped profile to engage an expanding distal end of the snap 304. Additionally or alternatively, the detent 320 may exhibit curvature. In some examples, the detent 320 may resemble a notch shape. In other examples, the detent 320 is integral with the frame 101 and/or a surface of the frame 101.

In this example, the first flexible portion 302, the second flexible portion 310 and/or the landing leg 104 include a resin, a plastic, a fibrous material such as carbon fiber, Kevlar, a rubber, or any one or more of many other materials and composites that have flexible qualities. Additionally or alternatively, an area or volume of material surrounding the antenna 106 consists of a flexible material.

In some examples, the secondary contact portion 309 is used to engage the frame 101 to provide additional resistive force. In some examples, a rotational spring 322 is used to bias the landing leg 104 to the first rotational position and/or bias the snap 304 to be retained by the detent 320. In other words, the landing leg 104 can be spring-loaded. In some examples, the entire landing leg 104 is composed of the same flexible material throughout a length of the landing leg 104 (e.g., an entire volume of the landing leg 104). Additionally or alternatively, the first flexible portion 302 and/or the landing leg 104 includes a passage 324 so that wires and/or cables associated with the antenna 106 can be routed to the frame 101 and/or another portion of the UAV 100.

While the example leg 104 is shown having the snap 304 to engage with the detent 320, any appropriate interface and/or mechanical contact may be used. For example, a ratcheting interface and/or cam-based mechanism may be implemented instead.

Figure 4:
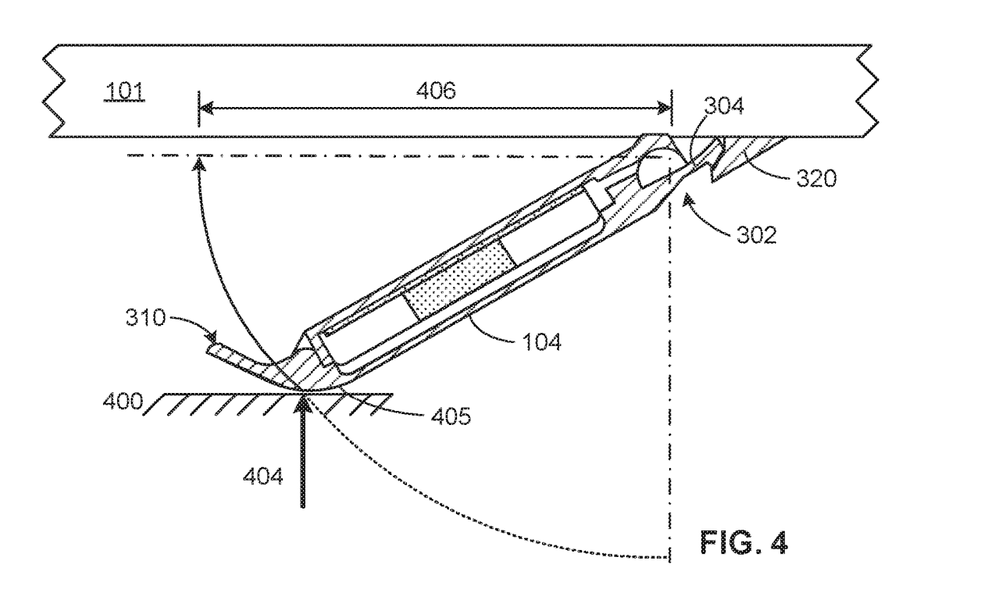
FIG. 4 illustrates the example landing leg touching the ground and fully extended from the UAV frame.

FIG. 4 illustrates the example landing leg 104 touching a landing surface or ground 400 and fully extended from the tubular frame 101. In particular, the illustrated example of FIG. 4 depicts a first stage of shock absorption of a multi-stage shock absorption process as the UAV 100 descends and makes initial contact with the ground 400. According to the illustrated example, a force 404 causes an upward motion of the leg 104 towards the frame 101.

To dissipate impact energy in this first stage of shock absorption, a rounded surface (e.g., a curved contact portion) 405 of the second flexible portion 310 contacts the ground 400 and, in turn, the force 404 in conjunction with a moment arm distance 406 causes the snap 304 to be removed from the detent 320. In other words, a requisite minimal impact force and/or resultant torque is exceeded to cause motion of the snap 304 away from the detent 320 and the removal of the snap 304 from the detent 320 absorbs a portion of the impact energy in this first stage.

Figure 5:
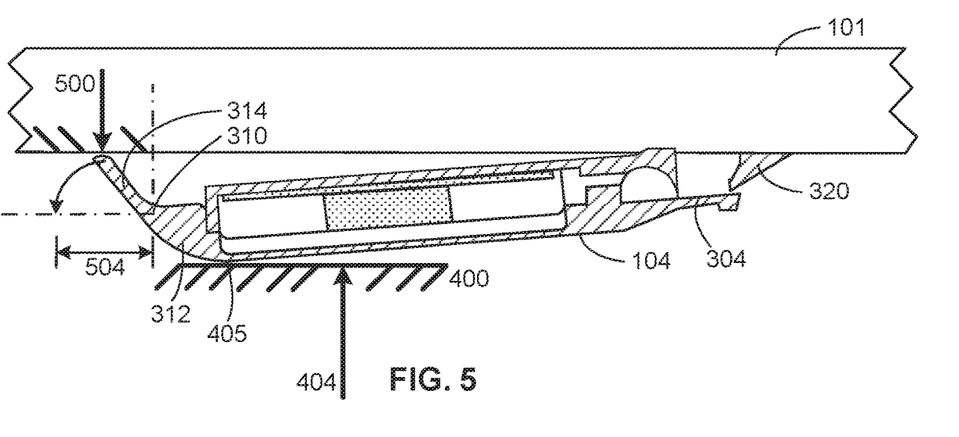
FIG. 5 illustrates the example landing leg rotationally flexed towards the UAV frame.

FIG. 5 illustrates the example landing leg 104 rotationally flexed towards the frame 101. In particular, a second stage of the multi-stage absorption process is shown such that the leg 104 is rotated to a second rotational position (e.g., a second angular position, a second angle of rotation) relative to the frame 101 in which the finger 314 of the second flexible portion 310 contacts the frame 101, thereby further reducing impact forces. According to the illustrated example, an outer surface of the frame 101 acts as a second engaging portion of the frame 101.

To dissipate additional impact energy (i.e., additional from the first stage of shock absorption shown in FIG. 4) in this depicted second stage of shock absorption of FIG. 5, the finger 314 of the second flexible portion 310 is pushed towards the frame 101 and flexes based on an opposing force 500 that causes a bending moment based on a radial distance 504, thereby requiring a greater amount of associated force to move the finger 314 against the frame 101. In particular, the finger 314 slides against the frame as the landing leg 104 is pressed towards the frame based on the force 404 pressing against the rounded surface 405 and/or the base 312. In other words, the second stage of shock absorption absorbs greater impact energy than the first stage of shock absorption in this example.

Figure 6:
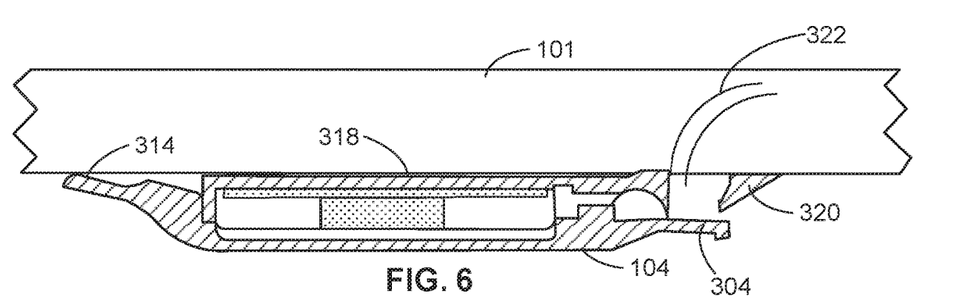
FIG. 6 illustrates the example landing leg fully rotationally flexed towards the UAV frame.

FIG. 6 illustrates the example landing leg 104 fully rotationally flexed towards the example frame 101. According to the illustrated example, the landing leg 104 will be at this fully flexed rotational position prior to recoiling to the rotational position described above in connection with FIG. 3. In this example, the inner surface 318 is in contact with the frame 101 and the finger 314 is fully flexed against the frame 101. According to the illustrated example, the spring 322 is used to recoil the landing leg 104 to the default pre-impact position shown in FIG. 3.

Figure 7:
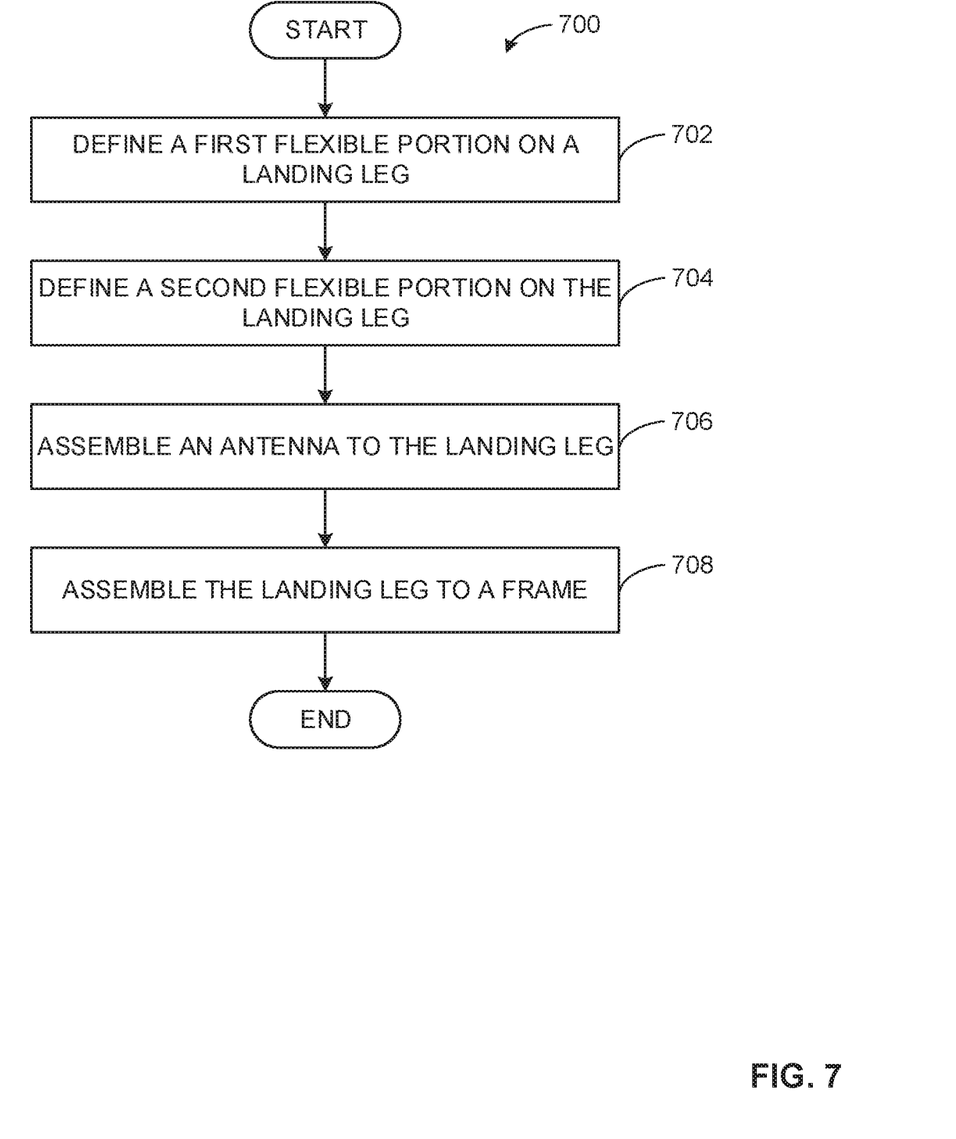
FIG. 7 is a flowchart representative of an example method to produce the examples disclosed herein.

FIG. 7 is a flowchart representative of an example method 700 to produce the examples disclosed herein. The example method 700 begins as the landing leg 104 is being assembled for later integration/assembly with a vehicle, such as an aircraft. In particular, the landing leg 104 is to be utilized as a landing support of the vehicle.

The first flexible portion 302 is placed/assembled onto or defined on a portion of the landing leg 104 to be positioned close to the pivot point 303 (block 702). In some examples, the first flexible portion 302 is assembled to the landing leg 104. In other examples, the first flexible portion 302 is integral with the landing leg 104 (e.g., the first flexible portion 302 is molded onto the landing leg 104).

The second flexible portion 310 is placed onto or defined on a distal end of the landing leg 104 (block 704). In this example, the second flexible portion 310 is assembled to the distal end of the landing leg 104. However, the second flexible portion 310 may be integral with the landing leg 104.

In some examples, the antenna 106 is assembled into the landing leg 104 (block 706). In some examples, the antenna 106 is inserted into an internal cavity of the landing leg 104.

Next, the landing leg 104 is assembled to a frame (block 708) and the process ends. In particular, the landing leg 104 is assembled to the frame 101 with the rotational pivot 303 operatively coupled therebetween. In some examples, the rotational spring 322 is operatively coupled between the landing leg and the frame.

Figure 8:
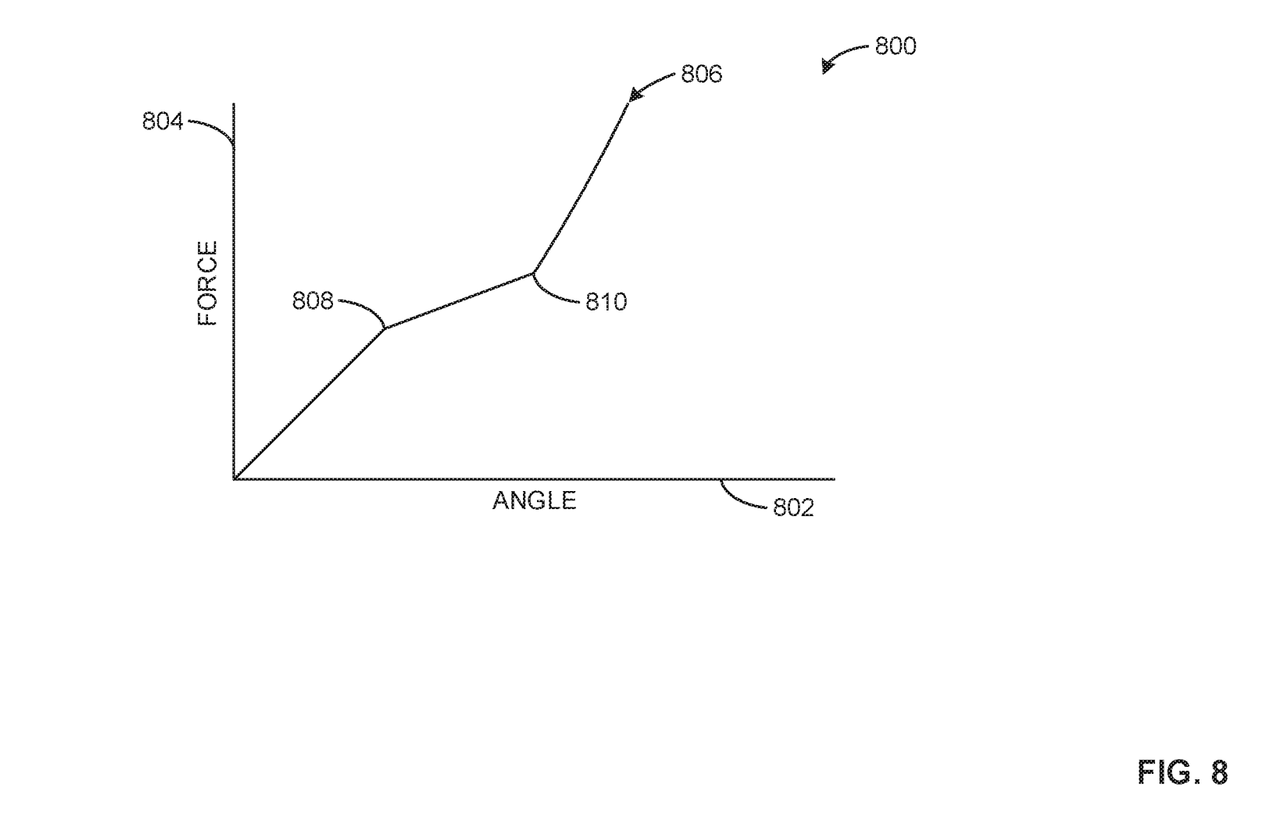
FIG. 8 is a graph depicting an example force profile associated with the examples disclosed herein.

FIG. 8 is a graph 800 depicting an example force profile associated with the example disclosed herein. The example graph 800 includes a horizontal axis 802 that represents an angular rotation of a landing leg, as well as a vertical axis 804, which represents a force encountered by the UAV 100. A corresponding curve 806 includes a first transition point 808, which represents a point at which the snap 304 is removed from the detent 320, and a second transition point, which represents a moment when the finger 314 contacts and begins to slide against the frame 101. As can be seen in the graph 800, the impact energy dissipation increases greatly when the finger 314 contacts the frame 101. Further, this multi-stage energy absorption is highly effective at overall energy dissipation because different amounts of impact energy are absorbed at distinct stages/times. In other words, the examples disclosed herein enable different amounts of impact energy to be dissipated at different times/stages in contrast to dissipating a large amount of impact energy in a short duration, which can cause excessive wear to components.

Example 1 includes an apparatus to reduce impact energy of an aircraft during landing. The apparatus includes a rotatable landing leg having a proximal end near an axis of rotation and a distal end opposite the proximal end, a first flexible portion of the proximal end, the first flexible portion to engage a first engaging portion at a first rotation angle of the rotatable landing leg, and a second flexible portion of the distal end, the second flexible portion to engage a second engaging portion at a second rotation angle of the rotatable landing leg.

Example 2 includes the subject matter of Example 1, and further includes including a third flexible portion at the proximal end to engage a third engaging portion when the rotatable landing leg rotates towards a frame of the aircraft.

Example 3 includes the subject matter of any one of Examples 1 or 2, and further includes a third flexible portion at the proximal end to engage a third engaging portion when the rotatable landing leg rotates towards a frame of the aircraft.

Example 4 includes the subject matter of any one of Examples 1 to 3, where the first flexible portion includes a snap, and where the first engaging portion includes a detent to retain the snap.

Example 5 includes the subject matter of any one of Examples 1 to 4, where the second flexible portion includes a finger, where an end of the finger is to contact and slide against a surface of the aircraft at the second rotation angle.

Example 6 includes the subject matter of Example 5, where the finger is curved towards the surface.

Example 7 includes the subject matter of any one of Examples 1 to 6, where the second flexible portion further includes a curved contact portion opposite the end of the finger to contact a landing surface prior to the finger contacting a frame of the aircraft.

Example 8 includes the subject matter of any one of Examples 1 to 7, where engagement between the second flexible portion and the second engagement portion has an associated force that exceeds a force associated with engagement between the first flexible portion and the first engagement portion.

Example 9 includes the subject matter of any one of Examples 1 to 8, where the first and second engaging portions include first and second surfaces, respectively, of a frame of the aircraft.

Example 10 includes the subject matter of any one of Examples 1 to 9, where the aircraft is an unmanned aerial vehicle.

Example 11 includes an aircraft having at least one surface of the aircraft, a landing leg that is rotatable about a pivot, where the landing leg includes a first flexible portion proximate the pivot and a second flexible portion proximate a distal end of the landing leg, a first engaging portion of the at least one surface to engage the first flexible portion at a first angle of rotation of the landing leg, and a second engaging portion of the at least one surface to engage the second flexible portion at a second angle of rotation of the landing leg.

Example 12 includes the subject matter of Example 11, and further includes an antenna disposed within the landing leg.

Example 13 includes the subject matter of any one of Examples 11 or 12, where the first flexible portion includes a snap, and where the first engagement portion includes a detent.

Example 14 includes the subject matter of Example 13, where the snap is to disengage from the detent when the landing leg is rotated past the first angle of rotation.

Example 15 includes the subject matter of any one of Examples 11 to 14, where engagement between the second flexible portion and the second engagement portion has an associated force that exceeds a force associated with engagement between the first flexible portion and the first engagement portion.

Example 16 includes the subject matter of any one of Examples 11 to 15, where the landing leg is spring-loaded.

Example 17 includes the subject matter of any one of Examples 11 to 16, where the second flexible portion includes a finger that is curved towards the at least one surface.

Example 18 includes the subject matter of any one of Examples 11 to 17, where the second flexible portion further includes a curved contact portion opposite an end of the finger to contact a landing surface prior to the finger contacting a frame of the aircraft.

Example 19 includes a method including defining a first flexible portion onto a landing leg, the first flexible portion to be placed near a pivot of the landing leg, where the first flexible portion is to engage a first engaging portion of a frame of an aircraft when the landing leg is rotated at a first angular rotation relative to the frame. The method also includes defining a second flexible portion onto the landing leg proximate a distal portion of the landing leg, where the second flexible portion is to engage a second engaging portion of the frame when the landing leg is rotated at a second angular rotation relative to the frame.

Example 20 includes the subject matter of Example 19, and further includes assembling an antenna to be disposed within the landing leg.

Example 21 includes the subject matter of any one of Examples 19 or 20, and further includes assembling the landing leg to the frame.

Example 22 includes the subject matter of any one of Examples 19 to 21, and further includes assembling a spring to be operatively coupled between the landing leg and the frame.

From the foregoing, it will be appreciated that example methods, apparatus and articles of manufacture have been disclosed that enable effective impact energy dissipation of a vehicle (e.g., an aircraft, a UAV, etc.) during landing, thereby reducing potential damage or long-term wear of the vehicle. Further, by integrating antennas in landing structure, some of the examples disclosed herein enable improved radio performance based on ground-facing or downward orientation of the antennas.

This application claims the benefit under 35 U.S.C. § 119(e) to U.S. Provisional Application 62/407,426 titled "FLEXIBLE ANTENNA DRONE LANDING GEAR," filed Oct. 12, 2017, which is incorporated herein by this reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A rotatable landing leg to absorb impact energy during landing of an aircraft, the aircraft having a frame, the rotatable landing leg comprising:
   a first end near an axis of rotation, the first end including a flexible snap to engage a detent at a first rotation angle of the rotatable landing leg, the snap extending from the first end of the rotatable landing leg and offset from the axis of rotation, the detent extending from the frame of the aircraft; and
   a second end opposite the first end, the second end including a flexible protrusion to engage the frame at a second rotation angle of the rotatable landing leg, wherein the flexible protrusion converges along a direction having a component toward the frame.

2. The rotatable landing leg as defined in claim 1, wherein the flexible protrusion includes a first flexible protrusion, and further including a second flexible protrusion at the first end to engage the frame of the aircraft when the rotatable landing leg rotates towards the frame of the aircraft.

3. The rotatable landing leg as defined in claim 1, further including an antenna.

4. The rotatable landing leg as defined in claim 1, wherein an end of the flexible protrusion is to contact and slide against a surface of the aircraft at the second rotation angle.

5. The rotatable landing leg as defined in claim 4, wherein the flexible protrusion is curved towards the surface.

6. The rotatable landing leg as defined in claim 5, further including a curved contact opposite the end of the flexible protrusion to contact a landing surface prior to the flexible protrusion contacting the frame of the aircraft.

7. The rotatable landing leg as defined in claim 1, wherein engagement between the flexible protrusion and the frame has an associated force that exceeds a force associated with engagement between the snap and the detent.

8. An aircraft comprising:
   a frame having a detent extending therefrom; and
   a landing leg that is rotatable relative to the frame about a pivot, the landing leg including a snap at a first end proximate the pivot and a flexible protrusion proximate a second end opposite the first end, the snap to engage the detent at a first angle of rotation of the landing leg, the snap extending in a longitudinal direction of the landing leg and offset from the pivot, the flexible protrusion to engage the frame at a second angle of rotation of the landing leg, the flexible protrusion to converge along a direction having a component toward the frame.

9. The aircraft as defined in claim 8, further including an antenna disposed within the landing leg.

10. The aircraft as defined in claim 8, wherein the snap is to disengage from the detent when the landing leg is rotated past the first angle of rotation.

11. The aircraft as defined in claim 8, wherein engagement between the flexible protrusion and the frame has an associated force that exceeds a force associated with engagement between the snap and the detent.

12. The aircraft as defined in claim 8, wherein the landing leg is spring-loaded.

13. The aircraft as defined in claim 8, wherein the flexible protrusion is curved towards a surface of the frame.

14. A method comprising:
defining a snap at a first end of a landing leg, the snap positioned near a pivot of the landing leg to enable the snap to engage a of detent extending from a frame of an aircraft at a first angle of rotation relative to the frame when the landing leg is rotated about the pivot, the snap extending in a length direction of the landing leg and offset from the pivot; and
defining a flexible protrusion at the landing leg proximate a second end of the landing leg opposite the first end to enable the flexible protrusion to engage the frame at a second angle of rotation relative to the frame when the landing leg is rotated about the pivot, the flexible protrusion to converge along a direction having a component toward the frame.

15. The method as defined in claim 14, further including placing an antenna within the landing leg.

16. The method as defined in claim 14, further including assembling the landing leg to the frame.

17. The method as defined in claim 16, further including assembling a spring between the landing leg and the frame.

18. The rotatable landing leg as defined in claim 1, wherein the frame includes a tubular frame.

19. The rotatable landing leg as defined in claim 1, wherein the flexible protrusion exhibits an arcuate shape.

* * * * *